United States Patent [19]

Kwoh

[11] Patent Number: 5,169,104
[45] Date of Patent: Dec. 8, 1992

[54] SPEAKER STAND

[76] Inventor: Frederick Y. S. Kwoh, 1/F, Unit 1, Shui Hing Centre 13, Sheung Yuet Road Kowloon Bay, Kowloon, Hong Kong

[21] Appl. No.: 771,307
[22] Filed: Oct. 2, 1991
[51] Int. Cl.⁵ .................................... F16M 11/00
[52] U.S. Cl. ............................ 248/176; D14/224; 248/638; 248/676
[58] Field of Search ........... 248/638, 637, 176, 676, 248/644, 678, 146; 381/205; D14/224

[56] References Cited

U.S. PATENT DOCUMENTS

| 3,385,929 | 5/1968 | Magyar et al. | |
| 4,033,653 | 7/1977 | Doring et al. | 248/188 X |
| 4,078,757 | 3/1978 | Waters | 248/158 X |
| 4,284,844 | 8/1981 | Belles | 179/180 X |
| 4,369,949 | 1/1983 | Zopf | 248/632 |
| 4,378,100 | 3/1983 | Minozzi et al. | 248/168 |
| 4,493,471 | 1/1985 | McInnis | 248/580 |
| 4,865,153 | 9/1989 | Toyoda | 181/153 |
| 4,880,077 | 11/1989 | Verse et al. | 248/638 X |
| 4,926,487 | 5/1990 | Yoshida | 381/186 |
| 4,948,076 | 8/1990 | Sumrell et al. | 248/176 X |
| 4,953,223 | 8/1990 | Householder | 381/188 |

FOREIGN PATENT DOCUMENTS 0037139 10/1981 European Pat. Off. .
829214 3/1960 United Kingdom .

Primary Examiner—Ramon O. Ramirez
Attorney, Agent, or Firm—Lyon & Lyon

[57] ABSTRACT

A speaker stand has a base plate and a top plate joined to the base plate through a column. The top plate has speaker cushions at the back edge. A ground pillar extends through the top plate, the column and the base plate to the ground. The ground pillar is loosely clamped in the top plate by a foam rubber bushing, to limit lateral movement but allow the ground pillar to be decoupled from the structure of the speaker stand. Unwanted vibration from the speaker cabinet is drained through the ground pillar to the ground to minimize interference and feedback and reduce audio coloration.

12 Claims, 1 Drawing Sheet

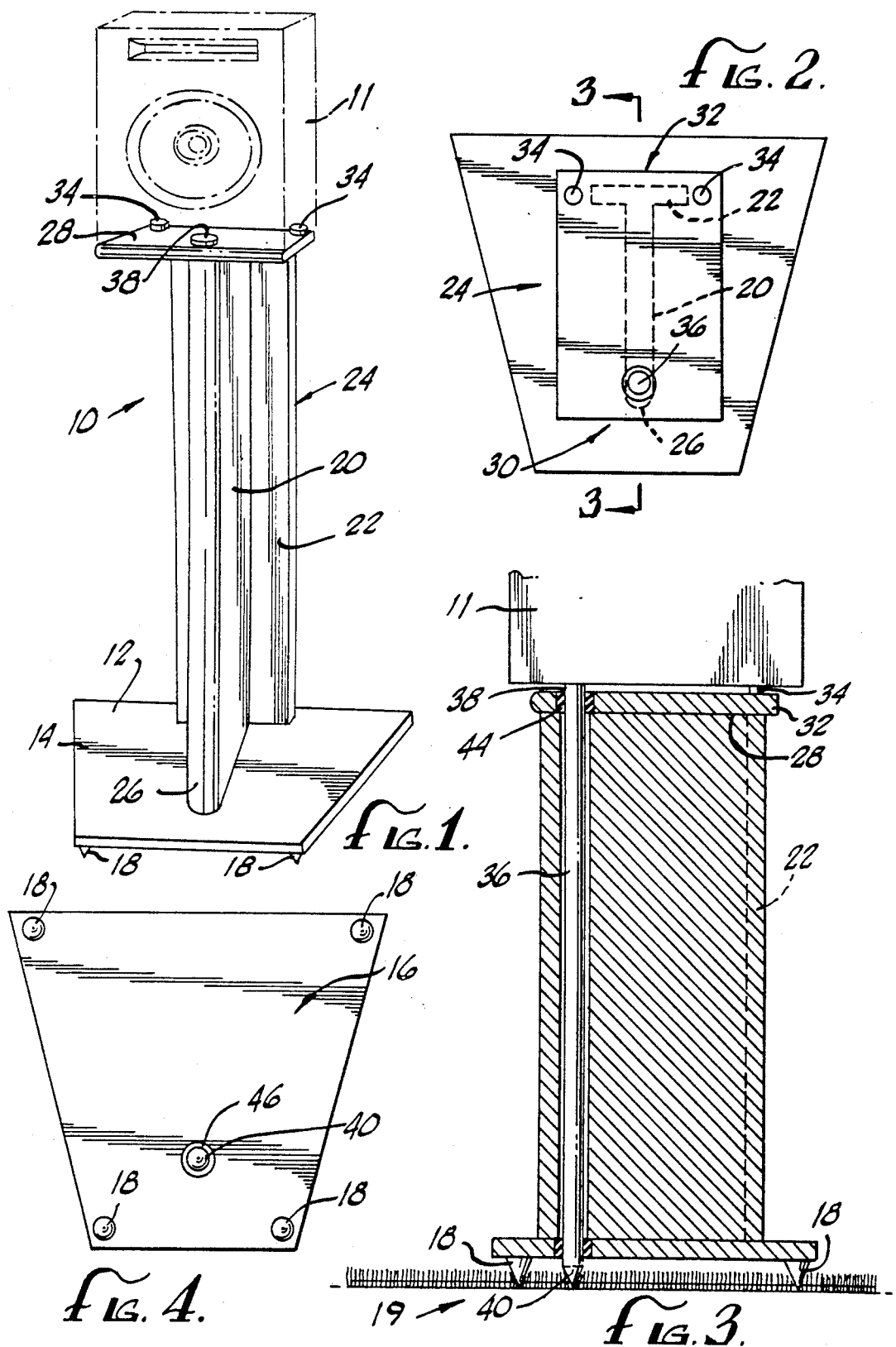

SPEAKER STAND

BACKGROUND OF THE INVENTION

Conventional speaker stands typically are merely simple rigid, floor-standing structures with a top plate on which the speaker sits. As the speaker operates, unwanted speaker stand vibrations often develop due to natural resonant frequencies of the structures and coupling between the speakers and the speaker stand supporting structure. Such unwanted cabinet vibration is a primary source of unwanted audio coloration.

SUMMARY OF THE INVENTION

The invention is directed towards a speaker stand which minimizes cabinet vibration and unwanted audio coloration. To this end, a speaker stand includes a base plate, a column extending from the base plate, and a top plate on top of the column. Speaker cushions are provided at the back of the top plate. A ground pillar extends from the top plate through the column and base plate to the ground. The ground pillar is loosely supported or clamped by a bushing in the top plate.

The speaker stand supports a speaker on three points on the top plate. Two of the these support points, i.e., the speaker cushions, are positioned near the back edge of the top plate and are made from vibration insulating material. The speaker cushions are firmly attached to the top plate. The third support point is the top of a vertically movable solid pillar which is not rigidly attached to the top plate, column, or base plate. Instead, the pillar is held in position by the bushing, which is soft vibration absorbent material such as foam rubber. The bushing is positioned in a hole through the top plate and it allows very little lateral movement of the pillar. At the same time the pillar is mechanically decoupled from the main structure of the speaker stand. A metal spike attached to the bottom end of the pillar provides direct coupling to the floor. Unwanted vibration from the speaker cabinet is drained through a single path (i.e., the pillar) to the floor with minimum interference to the rest of the speaker stand. Accordingly, the performance of any high fidelity loud speaker on the stand is improved by the mechanical grounding and structural decoupling provided by the present speaker stand.

It is an object of the invention to provide a speaker stand which provides improved speaker performance through mechanical grounding and structural decoupling. Other and further objects and advantages will appear hereinafter.

BRIEF DESCRIPTION OF THE DRAWINGS

In the drawings, wherein similar reference characters denote similar elements throughout the several views:

FIG. 1 is a perspective view of the present speaker stand supporting a speaker;

FIG. 2 is a top view thereof;

FIG. 3 is a section view taken along line 3—3 of FIG. 2; and

FIG. 4 is a bottom view of the speaker stand.

DETAILED DESCRIPTION OF THE PREFERRED EMBODIMENT

Turning to the drawings, the present speaker stand 10 includes a trapezoidal base plate 12 having upper and lower surfaces 14 and 16. Base plate floor spikes 18 extend from the lower surface 16 at the four corners of the base plate 12. A T-shaped column 24 attached to the upper surface 14 of the base plate 12 has a back plate 22 perpendicularly attached to a web plate 20.

A generally square or rectangular top plate 28 is attached to the upper end of the T-shaped column 24. Speaker cushions 34, made from a vibration insulating material such as rubber are firmly attached to the rear edge 32 of the top plate 28, adjacent the rear corners of the top plate, as shown in FIG. 2. A ground pillar 36 is positioned at the middle of the front edge 30 of the top plate 28. The top end 38 of the ground pillar 36 protrudes above the plane of the top plate 28 and is generally coplanar with the speaker cushions 34. The ground pillar 36 extends downwardly from the top plate 28 through an opening in the front edge 26 of the web plate 20, through the base plate 12 and to the floor 19. The ground pillar 36 has a metal ground spike 40 at its lower end. A plate bushing 44, made of a soft vibration absorbent material such as foam rubber loosely clamps the ground pillar 36 as it extends through the top plate 28. The plate bushing 44 is preferably attached to the top plate 28 in a hole through the top plate, as shown in FIG. 3. Alternatively, the ground pillar could be supported by a plate bushing in the base plate, or by bushings in both the top and base plates. The speaker 11 is supported on the two speaker cushions 34 at the rear of the top plate 28 and the top end 38 of the ground pillar 36.

In operation, vibration from the speaker cabinet is mechanically grounded by the ground pillar 36 which transmits the vibrations from the speaker cabinet directly to the floor 19. Vibrations which pass through the speaker cushions 34 travel through the column 24 to the base plate 12 and to the floor through base plate floor spikes 18. The metal ground spike 40 on the bottom end of the ground pillar 36 provides a direct mechanical coupling to the floor. As a result, unwanted vibration from the speaker cabinet is drained through a single path (i.e., the pillar) to the floor with minimum interference to the speaker stand. Mechanical interference and feedback is minimized.

While an embodiment and application of this invention have been shown and described, it would apparent to those skilled in the art that many more modifications are possible without departing from the inventive concepts herein. The invention, therefore, is not to be restricted except in the spirit of the following claims.

What is claimed is:

1. A speaker stand comprising:
   a base plate supported on a floor;
   a top plate having a front edge and a rear edge;
   a column joining the base plate and top plate;
   at least one speaker cushion on the top plate;
   a ground pillar passing through the base plate and the top plate contacting the floor; and
   a mechanical decoupler for supporting the ground pillar to at least one of the top and base plates.

2. The speaker stand of claim 1 further comprising two spaced apart speaker cushions adjacent the rear edge of the top plate.

3. The speaker stand of claim 1 wherein the ground pillar is disposed adjacent the front edge of the top plate.

4. The speaker stand of claim 1 further comprising a ground spike on the ground pillar, adjacent the base plate.

5. The speaker stand of claim 1 wherein the mechanical decoupler comprises a foam rubber bushing.

6. The speaker stand of claim 1 wherein the column is T-shaped.

7. The speaker stand of claim 1 wherein the top plate has a top surface and the ground pillar extends beyond the top surface of the top plate.

8. The speaker stand of claim 2 wherein the ground pillar is equally spaced apart from each speaker cushion.

9. A stand for an acoustic speaker comprising:
   a base plate supported on a floor;
   a column rigidly attached to the base plate;
   a top plate, having a front edge and a back edge, rigidly attached to the column;
   a pair of spaced apart speaker cushions adjacent to the back edge of the top plate;
   a ground pillar positioned adjacent the front edge of the top plate, in between the speaker cushions, with the ground pillar extending through the top plate, column, and base plate contacting the floor; and
   means for resiliently supporting the ground pillar to at least one of the top plate and base plate.

10. The speaker stand of claim 9 wherein the base plate is trapezoidal having parallel front and back edges, with the back edge longer than the front edge, and having two non parallel sides of the equal length and wherein the column is centered between the two non parallel sides of the base plate.

11. The speaker stand of claim 9 wherein the column has a web with a front edge and the ground pillar extends through the web adjacent to the front edge of the web.

12. The speaker of claim 11 wherein the web is perpendicular to the front edge of the base plate.

* * * * *